United States Patent
Hansson

(10) Patent No.: US 6,382,179 B1
(45) Date of Patent: May 7, 2002

(54) INTERNAL COMBUSTION ENGINE WITH FUEL INJECTION

(75) Inventor: Leif Hansson, Trosa (SE)

(73) Assignee: Scania CV Aktiebolag (SE)

( * ) Notice: Subject to any disclaimer, the term of this patent is extended or adjusted under 35 U.S.C. 154(b) by 0 days.

(21) Appl. No.: 09/623,667

(22) PCT Filed: Mar. 29, 1999

(86) PCT No.: PCT/SE99/00495

§ 371 Date: Sep. 6, 2000

§ 102(e) Date: Sep. 6, 2000

(87) PCT Pub. No.: WO99/50554

PCT Pub. Date: Oct. 7, 1999

(30) Foreign Application Priority Data

Apr. 1, 1998 (SE) .............................................. 9801145

(51) Int. Cl.$^7$ .................................................. F02B 5/00
(52) U.S. Cl. ....................................................... 123/305
(58) Field of Search ................................. 123/305, 299, 123/296, 294

(56) References Cited

U.S. PATENT DOCUMENTS

| | | | | |
|---|---|---|---|---|
| 1,527,923 A | * | 2/1925 | Rothart | 123/305 |
| 3,892,208 A | | 7/1975 | Anderson et al. | |
| 4,523,552 A | * | 6/1985 | Mukainakao | 123/143 B |
| 5,060,610 A | * | 10/1991 | Paro | 123/305 |
| 5,167,210 A | | 12/1992 | Leroy | |
| 5,522,357 A | * | 6/1996 | Nogi et al. | 123/305 |
| 6,196,183 B1 | * | 3/2001 | Bauer et al. | 123/295 |

* cited by examiner

Primary Examiner—Bibhu Mohanty
(74) Attorney, Agent, or Firm—Ostrolenk Faber Gerb & Soffen

(57) ABSTRACT

A combustion engine with direct injection has in each cylinder a fuel injector (3) whose fuel orifices (4) are so oriented that the projection (5') of the direction of each fuel spray, viewed in a plane perpendicular to the cylinder centerline, crosses a projection (8', 8", 9', 9") in the same plane of the valve disc of one of the valves.

10 Claims, 1 Drawing Sheet

INTERNAL COMBUSTION ENGINE WITH FUEL INJECTION

TECHNICAL DOMAIN

The present invention relates to an internal combustion engine with direct fuel injection, preferably a diesel engine, and concerns as an arrangement of the fuel injection nozzles to direct fuel spray past the valves for the cylinder.

STATE OF THE ART

Within vehicle engine technology there is ever greater demand for increased performance while at the same time increased environmental requirements are being set for emissions from engines. A major problem in this connection is that the combustion process is very complicated, so a measure adopted for a particular purpose often entails unintended disadvantages in another domain.

In direct injected diesel engines it has been necessary to compromise on various parameters in order to achieve acceptable combinations of performance and environmental acceptability. With regard to emission of nitrogen oxides it is undesirable to commence fuel injection too early. Nor is it desirable to increase the injection pressure overmuch, since this also adversely affects discharges of nitrogen oxides. On the other hand, it is undesirable to cease injection too late, since this increases the occurrence of undesirable residues of more or less unburnt fuel which may result in a variety of problems. If injection takes place too late, the engine's piston will have passed its upper dead center point and will be so far down that instead of injection taking place into the hollow situated in the piston the fuel sprays arising from the injection are directed towards the walls of the cylinder. As the cylinder walls are significantly cooler than the temperature in the piston hollow, this causes the occurrence of uncombusted particles usually known collectively as soot. This means not only that the engine emits soot particles via its exhaust system but also that some of the soot particles will accumulate in the engine's lubricating oil. This worsens the oil's lubricating characteristics, thereby possibly resulting in serious wear damage to the engine. The presence of soot particles in exhaust gases makes it necessary to adopt special measures for preventing their release into the atmosphere, e.g. by using special soot traps or other post-treatment of exhaust gases. All these measures entail solutions which are complicated, space-consuming and expensive.

The foregoing shows that there is a problem in that the period of time available for injection is too limited. It is therefore difficult to effect fuel injection in such a way as to meet all the requirements and, in particular, to do so in such a way as to achieve both low emissions of nitrogen oxides and little soot formation.

One solution to the problem of fuel sprays reaching the cylinder walls might be to modify the so-called cone angle, which is the angle which the fuel sprays, viewed in a vertical plane, form with one another, so that even late injection is directed towards the piston hollow. This means, however, that at the commencement of injection the piston is too near to the injector and there is too little space between the injector and the piston for the fuel to become finely distributed before it reaches the piston. In a further-developed variant of that solution, it would be possible to envisage the initial stages of injection taking place with a certain cone angle and the final stages of injection taking place with a different cone angle. Such a solution would entail, however, exacting requirements with regard to injector control and result in an expensive and complicated solution.

Known technology which may cited with respect to the present invention is JP 59-173 554, which refers to a four-valve engine provided with fuel injector which creates various powerful fuel sprays in different directions. In that case the piston is provided not only with a conventional piston hollow but also with recesses for the valves and a larger amount of fuel is injected towards the valve recesses than the fuel sprays directed between the valve recesses. Despite in that case a smaller amount of fuel being directed between the valves, this means that these sprays will reach the cylinder wall if injection takes place late, with the result that the aforesaid soot formation problem persists.

OBJECT OF THE INVENTION

The object of the invention is to provide a solution which brings about relatively late injection of the fuel so that the engine will not emit large amounts of nitrogen oxides, while at the same time the injection will not cause soot formation with its attendant disadvantages.

Another aim is to achieve this in a simple and inexpensive manner. A further aim is to be able to use the technique on existing engines.

SUMMARY OF THE INVENTION

The object of the invention is achieved by the fuel injector nozzle being so oriented in the cylinder that the projection of each fuel spray injection, viewed in a plane perpendicular to the cylinder center line, crosses a projection in the same plane of the valve disc of one of the valves. Orienting the fuel injector in this manner will cause the fuel spray to pass under a valve. Thermal radiation from the valve will cause more effective combustion and keep soot formation at a low level. As all the fuel sprays will be affected by valve heat, a more uniform environment for the various fuel sprays is achieved, resulting in a more homogeneous combustion. This is further assisted by the fact that a larger proportion of the fuel comes close to the hot valves. It will thus be possible to effect injection even at a time when the piston is relatively far from the injector and there would otherwise be risk of the fuel sprays reaching the cylinder wall.

Depending on the size of cylinder, it may be advantageous to have more than one fuel spray passing under one or more valves. In the case of a four-valve engine, for example, two fuel sprays may pass under each valve.

Further advantages and features of the invention are indicated in the description and the patent claims.

DESCRIPTION OF DRAWINGS

The invention is explained in more detail below with reference to an embodiment depicted in the accompanying drawing, in which.

DESCRIPTION OF PREFERRED EMBODIMENTS

Figure 1:
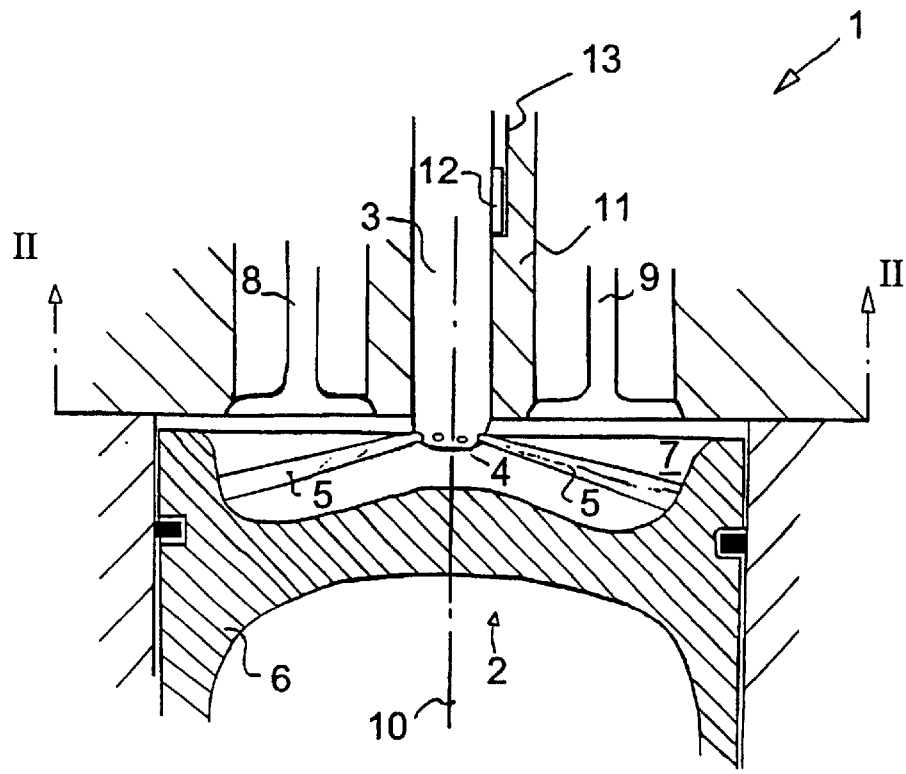
FIG. 1 shows a section through a cylinder in an engine according to the invention.

FIG. 1 depicts a four-stroke four-cylinder combustion engine 1, and more specifically a piston engine in the form of a diesel engine intended to drive a heavy-duty vehicle such as a truck or a bus. FIG. 1 shows only one cylinder 2, since all the cylinders are identical in form. The combustion engine 1 is provided with direct injection and has for this purpose in each cylinder a fuel injector 3 which, via a number of fuel nozzles 4, can deliver fuel sprays 5 in various directions in the cylinder 2. These fuel sprays 5 are in a conventional manner directed somewhat downwards along the shell surface in a conical shape. When a piston 6 in the cylinder is in an upper position, these fuel sprays 5 are directed into a recess 7 at the top of the piston 6. The cylinder 2 contains not only the piston 6 and the fuel injector 3 but also a number of valves 8,9 in the form of disc valves between which the fuel injector 3 is arranged, advantageously centrally. At least one valve 8 constitutes an inlet valve and at least one valve 9 constitutes an exhaust valve.

An essential aspect of the invention is how the fuel sprays 5 and hence the fuel nozzles 4 are oriented in the cylinder. This is further clarified in FIG. 2, which depicts a projection of the valves and of the directions of the fuel sprays 5 in a plane perpendicular to the cylinder center line 10 in FIG. 1, i.e. viewed in a direction 11—II in FIG. 1.

The engine 1 has in this case four valves per cylinder, viz. two inlet valves 8' and 8" and two exhaust valves 9' and 9", which latter in this case have smaller valve discs than the inlet valves. The fuel injector 3 is in this case oriented axially and situated centrally in the cylinder and has the fuel nozzles 4 mounted at even spacing, i.e. the fuel nozzles are situated at a mutually equal angular distance á. Each fuel spray 5 is represented here by the projection 5' of its direction line. As may be seen, the projection 5' of the direction of each fuel spray crosses a projection of one of the valves, i.e. none of the projections 5' is situated between the projections of the valves. In this particular case the number of valve sprays 5 is twice the number of valves and the projection of each valve is crossed by two projections 5' of the valve spray direction. The spacing angle á between the fuel nozzles is in this case 45°.

Depending on the number of valves and their size and location, another fuel injector version may be necessary, i.e. a different number of fuel nozzles 4 and different mutual positioning of them, in order to be able to direct the fuel sprays 5 as intended relative to the respective valves. Thus, for example, an engine with three valves per cylinder may have, for example, six fuel nozzles 4 per fuel injector 3 and the fuel nozzles may possibly be distributed irregularly in order to be able to direct the fuel sprays as desired.

Figure 2:
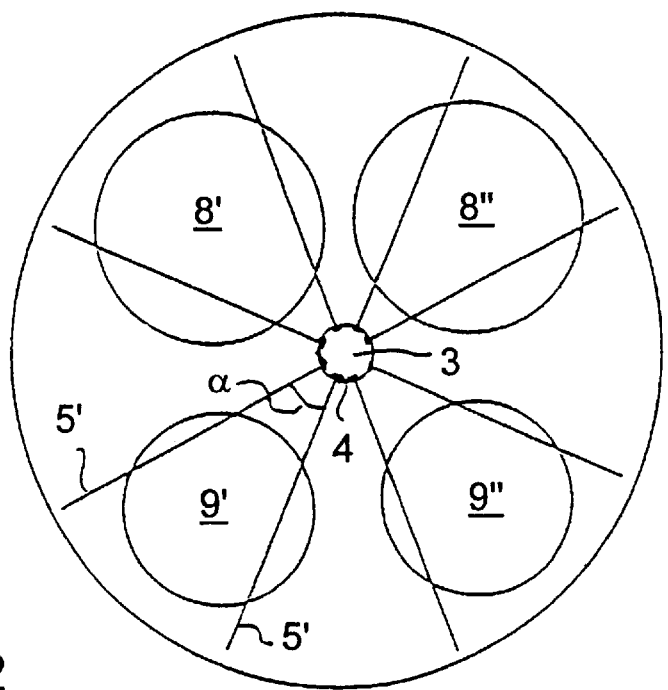
FIG. 2 shows a projection in the direction II—II in FIG. 1.

It is also possible, for example, in a version of the type depicted in FIG. 2, i.e. with four valves and eight fuel sprays per cylinder, to have a reduced angular spacing a between the two projections 5' which cross each valve projection. An advantage of this is that each projection 5' comes closer to the center of the respective projection and thus crosses the valve projection over a longer distance. Each fuel spray 5 will thus for a larger proportion of its length be under a hot valve disc.

During combustion, the valves of each cylinder, both inlet and exhaust valves, become powerfully heated and can therefore emit heat in the second stage of the work cycle of a cylinder. The solution proposed according to the invention utilises this heat emission to act upon injected fuel so as to cause a more advantageous combustion with, inter alia, reduced soot formation. This has great advantages from the wear point of view in that soot is in this respect a very troublesome factor, particularly if the soot enters the oil and forms oil soot.

Practical tests have shown that if the version according to FIG. 2 is modified so that every second fuel spray is between two adjacent valves the result is a considerably greater increase, of the order of 50% greater, than in a version according to FIG. 2. The orientation of the fuel injector 3 is thus of very great significance.

To ensure correct orientation of the fuel injector 3, it should be fitted with some form of mechanical rotational locking in the engine's cylinder head 11. An example of such an arrangement is depicted in FIG. 1, in which the fuel injector 3 is provided with a radial protrusion 12 which fits into an axial slot 13 in the cylinder head 11. This makes it easy to bring the fuel injector 3 into the correct position in the cylinder head 11 and thereafter lock it axially in a conventional manner, e.g. with a latch clamp. The rotational lock here depicted may of course be varied in a number of different ways as desired and necessary.

What is claimed is:

1. A cylinder and fuel injector combination for a direct injection combustion engine, wherein the combination comprises:

an engine cylinder having a longitudinal direction and a center line along the longitudinal direction; an engine piston in and movable through the cylinder in the longitudinal direction;

at least one inlet valve to the cylinder and at least one exhaust valve from the cylinder, both communicating into the cylinder above the piston; each of the valves including a valve disk which is in the cylinder and each valve disk being in a respective plane;

a fuel injector having a plurality of fuel injecting nozzles disposed in the cylinder; the nozzles being positioned and oriented so that each nozzle delivers a respective spray of fuel in a respective direction in the cylinder, the nozzles being so oriented in the cylinder that the projection of the direction of a spray of fuel from every nozzle, as viewed in a plane perpendicular to the longitudinal direction center line of the cylinder, crosses a projection in the same plane as the valve disk of one of the valves.

2. The combination of claim 1, wherein the plurality of the nozzles are of such number and the nozzles are so oriented and the valve disks are so positioned in the cylinder that the projection of each of the valve disks is crossed by the projection of the direction of at least one of the fuel sprays from at least one fuel nozzle.

3. The combination of claim 2, wherein the fuel injector has a number of fuel nozzles that is a whole number multiple of the number of valves in the cylinder.

4. The combination of claim 3, wherein that whole number multiple is 2.

5. The combination of claim 4, wherein the number of valves to and from the cylinder is 4.

6. The combination of claim 2, wherein the fuel nozzles are arranged circumferentially around the injector in the cylinder with equal spacing.

7. The combination of claim 6, wherein the valve disks are arranged around the center line of the cylinder generally with equal spacing.

8. The combination of claim 4, wherein the valve disks are arranged around the center line of the cylinder generally with equal spacing.

9. The combination of claim 1, further comprising a device for rotationally fixing the injector in a predetermined rotational position relative to the cylinder.

10. The combination of claim 1, wherein the cylinder and valves are for a diesel engine.

* * * * *